United States Patent
Birenheide

(10) Patent No.: US 7,703,089 B2
(45) Date of Patent: Apr. 20, 2010

(54) COMPATIBILITY FRAMEWORK USING VERSIONING CLASS LOADERS

(75) Inventor: Richard Birenheide, Neckargemund (DE)

(73) Assignee: SAP AG, Walldorf (DE)

( * ) Notice: Subject to any disclaimer, the term of this patent is extended or adjusted under 35 U.S.C. 154(b) by 1227 days.

(21) Appl. No.: 11/118,738

(22) Filed: Apr. 29, 2005

(65) Prior Publication Data
US 2006/0248140 A1  Nov. 2, 2006

(51) Int. Cl.
*G06F 9/44* (2006.01)
(52) U.S. Cl. .................. 717/166; 717/170; 719/315
(58) Field of Classification Search ................. 717/166; 719/315
See application file for complete search history.

(56) References Cited

U.S. PATENT DOCUMENTS

| | | | |
|---|---|---|---|
| 5,493,658 A | 2/1996 | Chiang et al. | |
| 5,544,360 A | 8/1996 | Lewak | |
| 5,659,751 A * | 8/1997 | Heninger | 719/332 |
| 5,761,655 A | 6/1998 | Hoffman | |
| 5,774,716 A | 6/1998 | Harbinski et al. | |
| 5,781,191 A | 7/1998 | Mayuzumi et al. | |
| 5,966,702 A | 10/1999 | Fresko et al. | |
| 5,974,428 A * | 10/1999 | Gerard et al. | 707/203 |
| 6,282,698 B1 | 8/2001 | Baker et al. | |
| 6,339,841 B1 | 1/2002 | Merrick et al. | |
| 6,470,494 B1 | 10/2002 | Chan et al. | |
| 6,480,880 B2 | 11/2002 | White et al. | |
| 6,681,242 B1 | 1/2004 | Kumar et al. | |
| 6,748,396 B2 | 6/2004 | Klicnik et al. | |
| 6,772,408 B1 | 8/2004 | Velonis et al. | |
| 6,836,889 B1 | 12/2004 | Chan et al. | |
| 6,915,461 B1 | 7/2005 | Watanabe | |
| 7,039,923 B2 * | 5/2006 | Kumar et al. | 719/331 |
| 7,051,324 B2 | 5/2006 | Gissel et al. | |
| 2002/0147971 A1 * | 10/2002 | Adams | 717/165 |
| 2003/0009480 A1 | 1/2003 | Lin et al. | |
| 2003/0081003 A1 | 5/2003 | Kutay et al. | |
| 2003/0110469 A1 | 6/2003 | Jackson | |
| 2003/0121031 A1 * | 6/2003 | Fraenkel et al. | 717/166 |
| 2003/0167349 A1 * | 9/2003 | Krohn et al. | 709/311 |
| 2003/0177484 A1 | 9/2003 | Bosschaert et al. | |
| 2003/0200350 A1 * | 10/2003 | Kumar et al. | 709/315 |
| 2004/0015783 A1 | 1/2004 | Lennon et al. | |
| 2004/0015856 A1 | 1/2004 | Goward et al. | |
| 2004/0015936 A1 * | 1/2004 | Susarla et al. | 717/166 |
| 2004/0055005 A1 * | 3/2004 | Creswell et al. | 719/315 |
| 2004/0237028 A1 | 11/2004 | Softky | |
| 2004/0261030 A1 | 12/2004 | Nazzal | |

(Continued)

OTHER PUBLICATIONS

Stuckenholz, A. 2005. Component evolution and versioning state of the art. SIGSOFT Softw. Eng. Notes 30, 1 (Jan. 2005), 7. DOI= http://doi.acm.org/10.1145/1039174.1039197.*

(Continued)

*Primary Examiner*—James Rutten
(74) *Attorney, Agent, or Firm*—Schwegman, Lundberg & Woessner, P.A.

(57) ABSTRACT

A method and system for performing version-based class loading. In one embodiment, a first version is sought to continue running an application, where a first class is associated with the first version being sought. A first class loader capable of loading the first class is created. The first class is then loaded using the first class loader.

11 Claims, 14 Drawing Sheets

U.S. PATENT DOCUMENTS

| | | |
|---|---|---|
| 2005/0091644 A1 | 4/2005 | Chilimbi |
| 2005/0166148 A1 | 7/2005 | Garding |
| 2005/0166189 A1 | 7/2005 | Ma |
| 2006/0168567 A1 | 7/2006 | Kressin et al. |

OTHER PUBLICATIONS

"Notice of Allowance for U.S. Appl. No. 10/835,752 mailed Oct. 5, 2007".

"Office action for U.S. Appl. No. 10/835,752 mailed Jun. 19, 2007", (Oct. 17, 2007).

*Non-Final Office Action for U.S. Appl. No. 11/118,685*, Mailed Feb. 3, 2009, 11 pages.

"Enterprise JavaBeans Programmer's Guide", *Inprise Corporation*, Version 4.5, Chapter 7 Copyright 200-2001, 91-150.

"Sun's Java 2 Platform SE v1.3.1: Class ClassLoader", SUN Microsystems Inc., (2001), 1.

"User's Guide iPlant Application Server Integration for VisualCafe", (Nov. 2000), 1-59.

Arni, Faiz , et al., "Commercial Component Creation (EJB 2.0)", *Enterprise JavaBeans Components Technology Based Components*, (Apr. 5, 2001), pp. 1-24.

Flanagan, D., "Java Examples in a Nutshell", O'Reilly, (1997), 20 and 153.

Grundy, J., "Storage and retrieval of software components using aspects", *computer science conference, ACSC 2000, 23rd Australasian*, (2000), 95-102.

* cited by examiner

COMPATIBILITY FRAMEWORK USING VERSIONING CLASS LOADERS

TECHNICAL FIELD

Embodiments of the invention generally relate to the field of data processing systems and, more particularly, to a system and method for employing compatibility framework using version-based class loaders.

BACKGROUND

Even though standards-based application software (e.g., Java based application software) has the potential to offer true competition at the software supplier level, legacy proprietary software has proven reliability, functionality and integration into customer information systems (IS) infrastructures. Customers are therefore placing operational dependency on standards-based software technologies with caution. Not surprisingly, present day application software servers tend to include instances of both standard and proprietary software suites, and, often, "problems" emerge in the operation of the newer standards-based software, or interoperation and integration of the same with legacy software applications.

The prior art application server 100 depicted in FIG. 1A provides a good example. FIG. 1A shows a prior art application server 100 having both an ABAP legacy/proprietary software suite 103 and a Java J2EE standards-based software suite 104. A connection manager 102 routes requests (e.g., HTTP requests, HTTPS requests) associated with "sessions" between server 100 and numerous clients (not shown) conducted over a network 101. A "session" can be viewed as the back and forth communication over a network 101 between computing systems (e.g., a particular client and the server.

The back and forth communication typically involves a client ("client") sending a server 100 ("server") a "request" that the server 100 interprets into some action to be performed by the server 100. The server 100 then performs the action and if appropriate returns a "response" to the client (e.g., a result of the action). Often, a session will involve multiple, perhaps many, requests and responses. A single session through its multiple requests may invoke different application software programs.

For each client request that is received by the application server's connection manager 102, the connection manager 102 decides to which software suite 103, 104 the request is to be forwarded. If the request is to be forwarded to the proprietary software suite 103, notification of the request is sent to a proprietary dispatcher 105, and, the request itself is forwarded into a request/response shared memory 106. The proprietary dispatcher 105 acts as a load balancer that decides which one of multiple proprietary worker nodes $107_1$ through $107_N$ are to actually handle the request.

A worker node is a focal point for the performance of work. In the context of an application server that responds to client-server session requests, a worker node is a focal point for executing application software and/or issuing application software code for downloading to the client. The term "working process" generally means an operating system (OS) process that is used for the performance of work and is also understood to be a type of worker node. For convenience, the term "worker node" is used throughout the present discussion.

When the dispatcher 105 identifies a particular proprietary worker node for handling the aforementioned request, the request is transferred from the request/response shared memory 106 to the identified worker node. The identified worker node processes the request and writes the response to the request into the request/response shared memory 106. The response is then transferred from the request/response shared memory 106 to the connection manager 102. The connection manager 102 sends the response to the client via network 101.

Note that the request/response shared memory 106 is a memory resource that each of worker nodes $107_1$ through $107_L$ has access to (as such, it is a "shared" memory resource). For any request written into the request/response shared memory 106 by the connection manager 102, the same request can be retrieved by any of worker nodes $107_1$ through $107_L$. Likewise, any of worker nodes $107_1$ through $107_L$ can write a response into the request/response shared memory 106 that can later be retrieved by the connection manager 102. Thus the request/response shared memory 106 provides for the efficient transfer of request/response data between the connection manager 102 and the multiple proprietary worker nodes $107_1$ through $107_L$.

If the request is to be forwarded to the standards based software suite 104, notification of the request is sent to the dispatcher 108 that is associated with the standards based software suite 104. As observed in FIG. 1A, the standards-based software suite 104 is a Java based software suite (in particular, a Java 2 Enterprise Edition (J2EE) suite) that includes multiple worker nodes $109_1$ through $109_N$.

A Java Virtual Machine is associated with each worker node for executing the worker node's abstract application software code. For each request, dispatcher 108 decides which one of the N worker nodes is best able to handle the request (e.g., through a load balancing algorithm). Because no shared memory structure exists within the standards based software suite 104 for transferring client session information between the connection manager 102 and the worker nodes $109_1$ through $109_N$, separate internal connections have to be established to send both notification of the request and the request itself to the dispatcher 108 from connection manager 102 for each worker node. The dispatcher 108 then forwards each request to its proper worker node.

A virtual machine (VM), as is well understood in the art, is an abstract machine that converts (or "interprets") abstract code into code that is understandable to a particular type of a hardware platform (e.g., a particular type of processor). Because virtual machines operate at the instruction level they tend to have processor-like characteristics, and, therefore, can be viewed as having their own associated memory. The memory used by a functioning virtual machine is typically modeled as being local (or "private") to the virtual machine.

Various problems exist with respect to the prior art application server 100 of FIG. 1A. For example, as application development projects grow larger, class loading becomes both increasingly important and cumbersome. "Class loading" is a technique used primarily by software developers to make programming code truly mobile. For example, every mobile code system requires the ability to dynamically load code from outside a system (e.g., from a network or a disk) into the system. In Java, this loading of the code is performed by class loaders. In other words, class loading provides an essential benefit of having a Java virtual machine by converting a named class into the bits responsible for implementing that class. Also, because of the class loading technique, the Java runtime does not need to know anything about files and file system when running Java programs. However, the conventional class loading does not provide any kind of versioning mechanism, which often results in compatibility problems.

FIG. 1B illustrates a prior art class loading mechanism hierarchy 150. In the illustrated embodiment, various types of class loaders 152-156 are arranged in tree-based hierarchy 150 having the bootstrap class loaders 152 as the root of the tree. The bootstrap class loader 152 is the only class loader without a parent, while each of the user-defined class loaders is assigned a parent class loader. Generally, the default parent class loader is the system (or application) class loader 156. In a typical Java virtual machine, a bootstrap class loader 152 and two user-defined class loaders, an extension class loader 154 and a system class loader 156, are provided. The bootstrap class loader 152 is responsible for loading the core Java classes (e.g., java.* and javax.*) into the virtual machine. The extension class loader 154 loads classes from the Java Runtime Environment's extension directories, while the system class loader 156 is regarded as responsible for loading classes from the system class path. The delegation model, as referenced by dotted arrows, runs from the system class loader 156 to the extension class loader 154 to the bootstrap class loader 152.

Although the conventional class loading mechanism hierarchy 150 provides the developer with an extensive flexibility when assembling and extending an application, it is also severely limited with dealing with independent parts of coding having different coding versions. When relatively independent parts of coding have to work together, changing design or communicating protocol or interfaces becomes problematic or even impossible for newer versions, particularly when the new version has to work with the old version of coding. For example, classes are not capable of receiving constant enhancements during development of different versions, since the same class is required to be in compliance with different versions. This problem is exasperated when a complex application with relatively independent parts needs to use different versions of the same base application programming interface (API). In this case, a part of the application remains unchanged relying on old API classes, while another part of the application is further in development using newer API classes. The problem is further complicated when different interfaces and/or services are used across the development project.

SUMMARY

A method and system for employing compatibility framework using version-based class loaders. In one embodiment, an application seeks a particular version that is necessary to continue running the application. A class associated with the particular version is identified from a set of already packaged classes that are associated with various versions. An appropriate class loader is created that is capable of loading the class. The class loader is then used to load the class and its dependent classes, if any.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
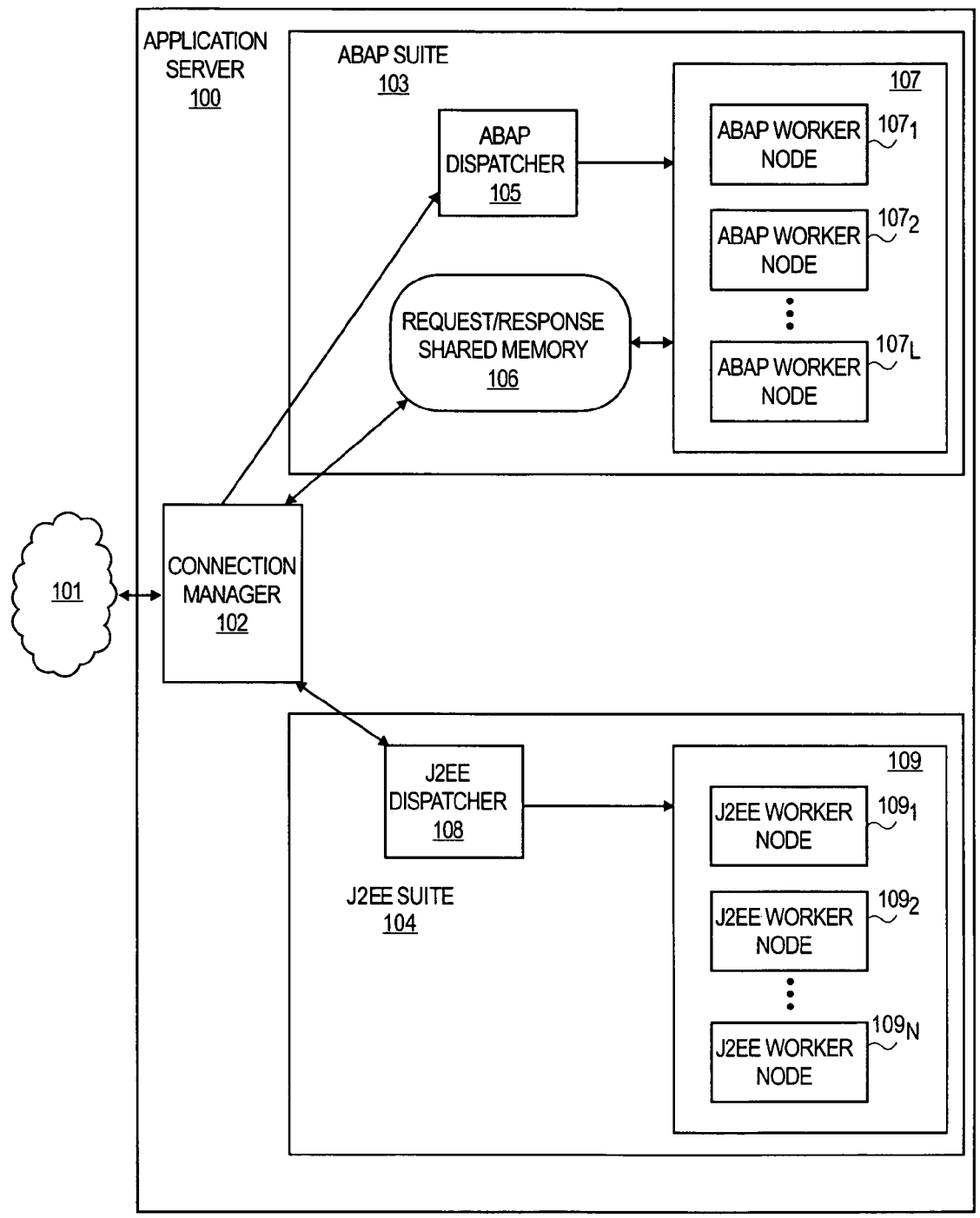
FIG. 1A illustrates a prior art application server.
Figure 1B:
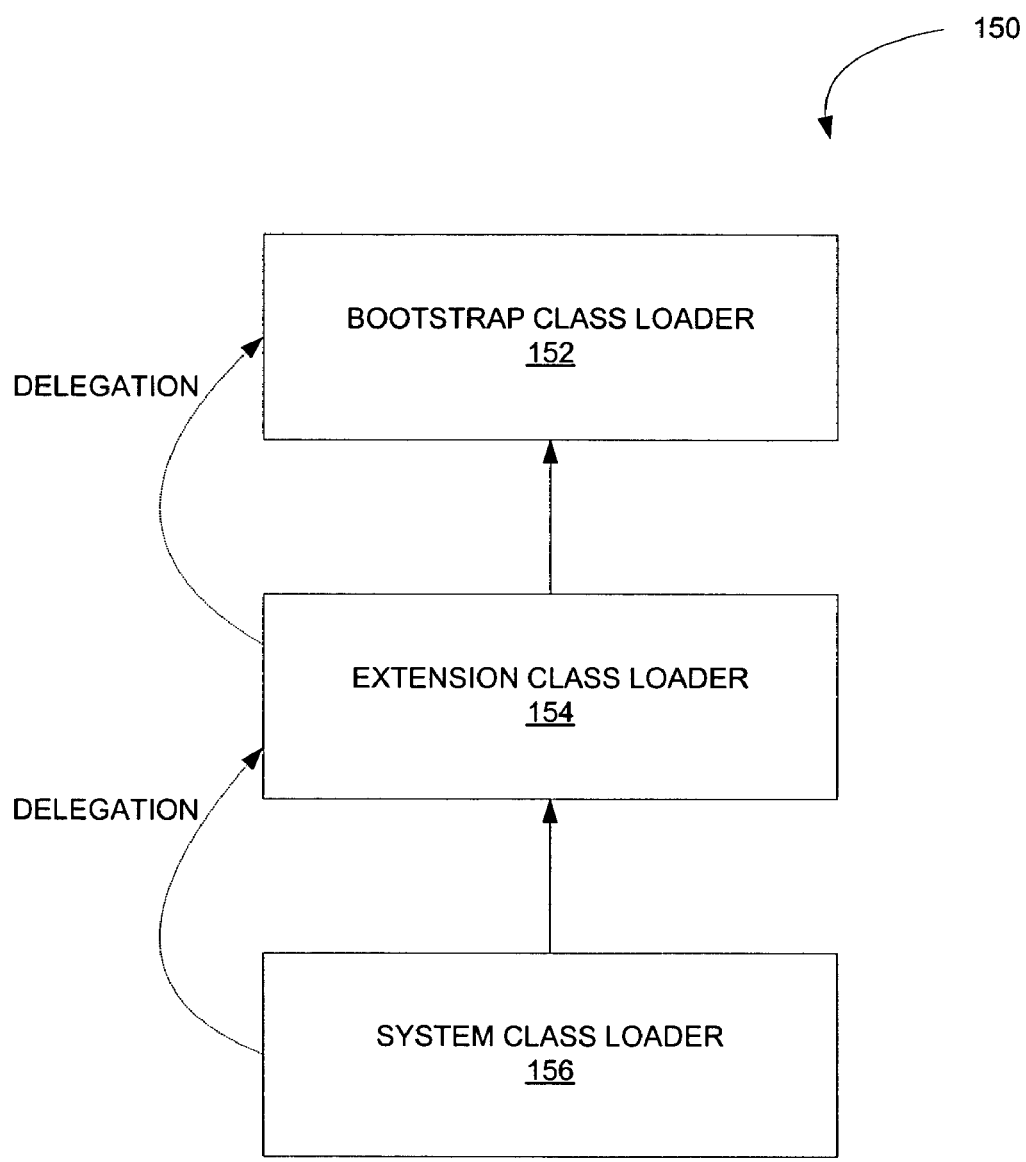
FIG. 1B illustrates a prior art class loading mechanism hierarchy.

Described below is a system and method for employing compatibility framework using version-based class loaders. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
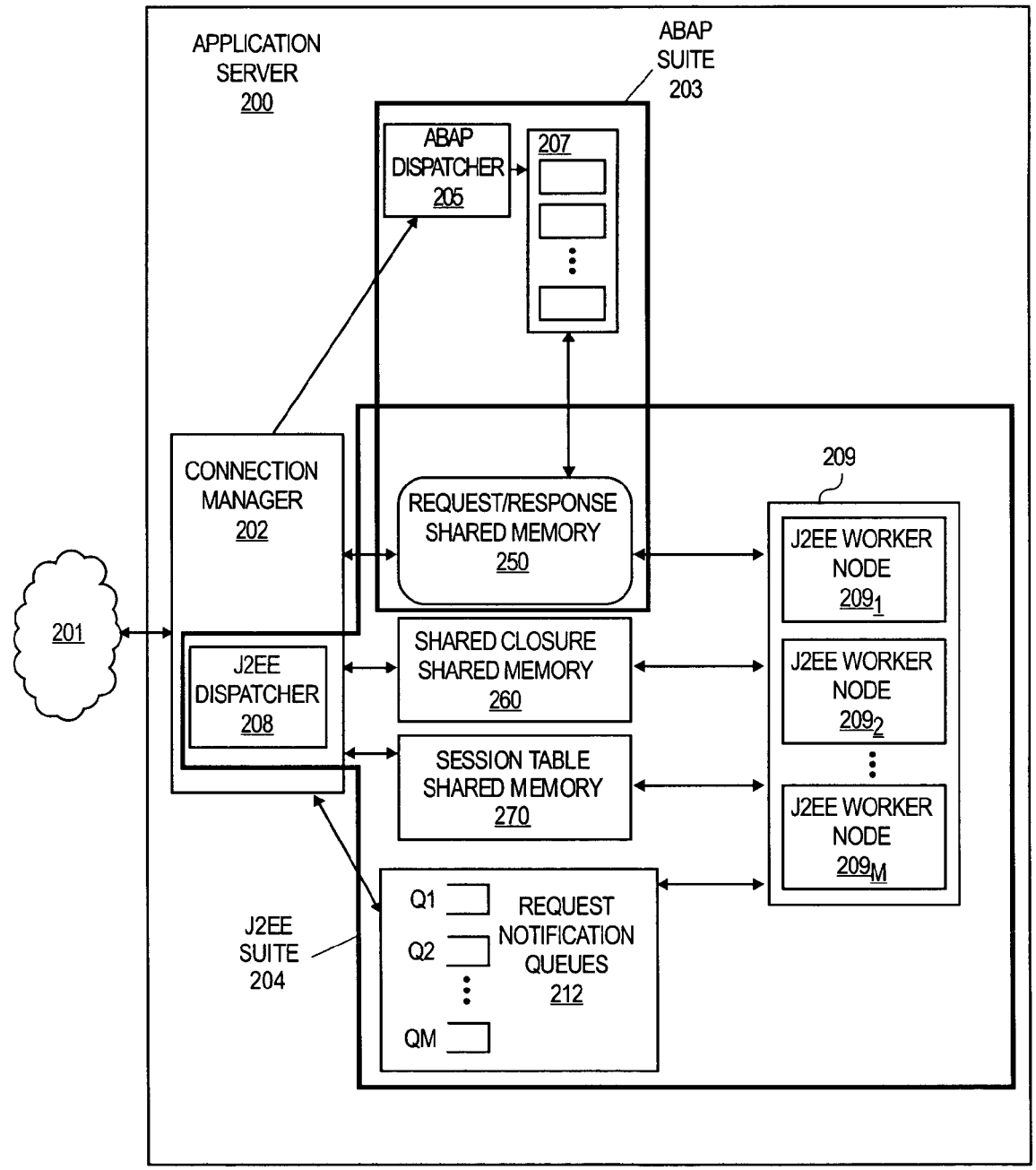
FIG. 2 illustrates the architecture of an improved application server in accordance with embodiments of the invention.

FIG. 2 shows the architecture of an improved application server 200 in accordance with embodiments of the invention. First, in comparison to FIG. 1A, the role of the connection manager 202 has been enhanced to at least perform dispatching 208 for the standards based software suite 204 (so as to remove the additional connection overhead associated with the prior art system's standards-based software suite dispatching procedures).

Second, the connection manager 202 is protocol independent. A protocol handler can be plugged into the connection manager 202 to support any one of a number of protocols by which a request can be conveyed to the connection manager 202. For example, handlers for protocols such as the hypertext transfer protocol (HTTP), secure HTTP (HTTPS), simple mail transfer protocol (SMTP), network news transfer protocol (NNTP), Telnet, File Transfer Protocol (FTP), Remote Method Invocation (RMI), P4 (a proprietary protocol used by the assignee of this application), and T3, available from BEA Systems, Inc., may be provided at the connection manager so that it can receive a request conveyed from a client in accordance with any of these protocols.

Third, the role of a shared memory has been expanded to at least include: a) a first shared memory region 250 that supports request/response data transfers not only for the proprietary suite 203 but also the standards based software suite 204; b) a second shared memory region 260 that stores session objects having "low level" session state information (i.e., information that pertains to a request's substantive response such as the identity of a specific servlet invoked through a particular web page); and, c) a third shared memory region 270 that stores "high level" session state information (i.e., information that pertains to the flow management of a request/response pair within the application server (e.g., the number of outstanding active requests for a session)).

Fourth, request notification queues 212 Q1 through QM, one queue for each of the worker nodes $209_1$ through $209_M$ has been implemented within the standards-standards-based software suite 204. As will be described in more detail below, the shared memory structures 250, 260, 270 and request notification queues 212 help implement a fast session fail over protection mechanism in which a session that is assigned to a first worker node can be readily transferred to a second worker node upon the failure of the first worker node.

Shared memory is memory whose stored content can be reached by multiple worker nodes. Here, the contents of the shared memory region 250 can be reached by each of worker nodes in 207 and 209. Additionally, the contents of shared memory regions 260 and 270 can be reached by each of worker nodes $209_1$ through $209_M$. Different types of shared memory technologies may be utilized within the application server 200 and yet still be deemed as being a shared memory structure. For example, shared memory region 250 may be implemented within a "connection" oriented shared memory technology while shared memory region 260 may be implemented with a "shared closure" oriented shared memory technology. A more thorough discussion of these two different types of shared memory implementations is provided in more detail below in section 5.0 entitled "Implementation Embodiment of Request/Response Shared Memory" and section 6.0 entitled "Implementation Embodiment of Shared Closure Based Shared Memory".

The connection oriented request/response shared memory region 250 effectively implements a transport mechanism for request/response data between the connection manager and the worker nodes. That is, because the connection manager is communicatively coupled to the shared memory, and because the shared memory is accessible to each worker node, the request/response shared memory 250—at perhaps its broadest level of abstraction—is a mechanism for transporting request/response data between the connection manager and the applicable worker node(s) for normal operation of sessions (i.e., no worker node failure) as well as those sessions affected by a worker node crash.

Although the enhancements of the application server 200 of FIG. 2 have been directed to improving the reliability of a combined ABAP/J2EE application server, it is believed that improved architectural features and methodologies can be more generally applied to various forms of computing systems that manage data processing and communicative sessions, whether or not such computing systems contain different types of application software suites, and whether any such application software suites are standards-based or proprietary. Moreover, it is believed that such architectural features and methodologies are generally applicable to data processing and communicative sessions regardless of, for example, any particular type of shared memory technology employed.

For example, in operation, the connection manager 202 forwards actual request data to the first shared memory region 250 (request/response shared memory 250) regardless of whether the request is to be processed by one of the proprietary worker nodes 207 or one of the standards based worker nodes 204. Likewise, the connection manager 202 receives response data for a request from the request/response shared memory 250 whether a proprietary worker node or a standards based worker node generates the response.

With the exception of having to share the request/response shared memory 250 with the worker nodes 209 of the standards-based software suite 204, the operation of the proprietary software suite 203 is essentially the same as that described in the background, in one embodiment of the invention. That is, the connection manager 202 forwards request notifications to the proprietary dispatcher 205 and forwards the actual requests to the request/response shared memory 250. The proprietary dispatcher 205 then identifies which one of the proprietary worker nodes 207 is to handle the request. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

In an alternative embodiment, the ABAP dispatcher 205 is integrated into the connection manager, just as the J2EE dispatcher 208. Indeed, it is contemplated that a single dispatcher may encompass the functionality of both dispatchers 205 and 208. In the case where the dispatcher 205 is integrated into the connection manager 202, the connection manager identifies which one of the proprietary worker nodes 207 is to handle a request and via its integrated dispatcher capabilities, forwards the request to the request/response shared memory 250. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

Figure 3:
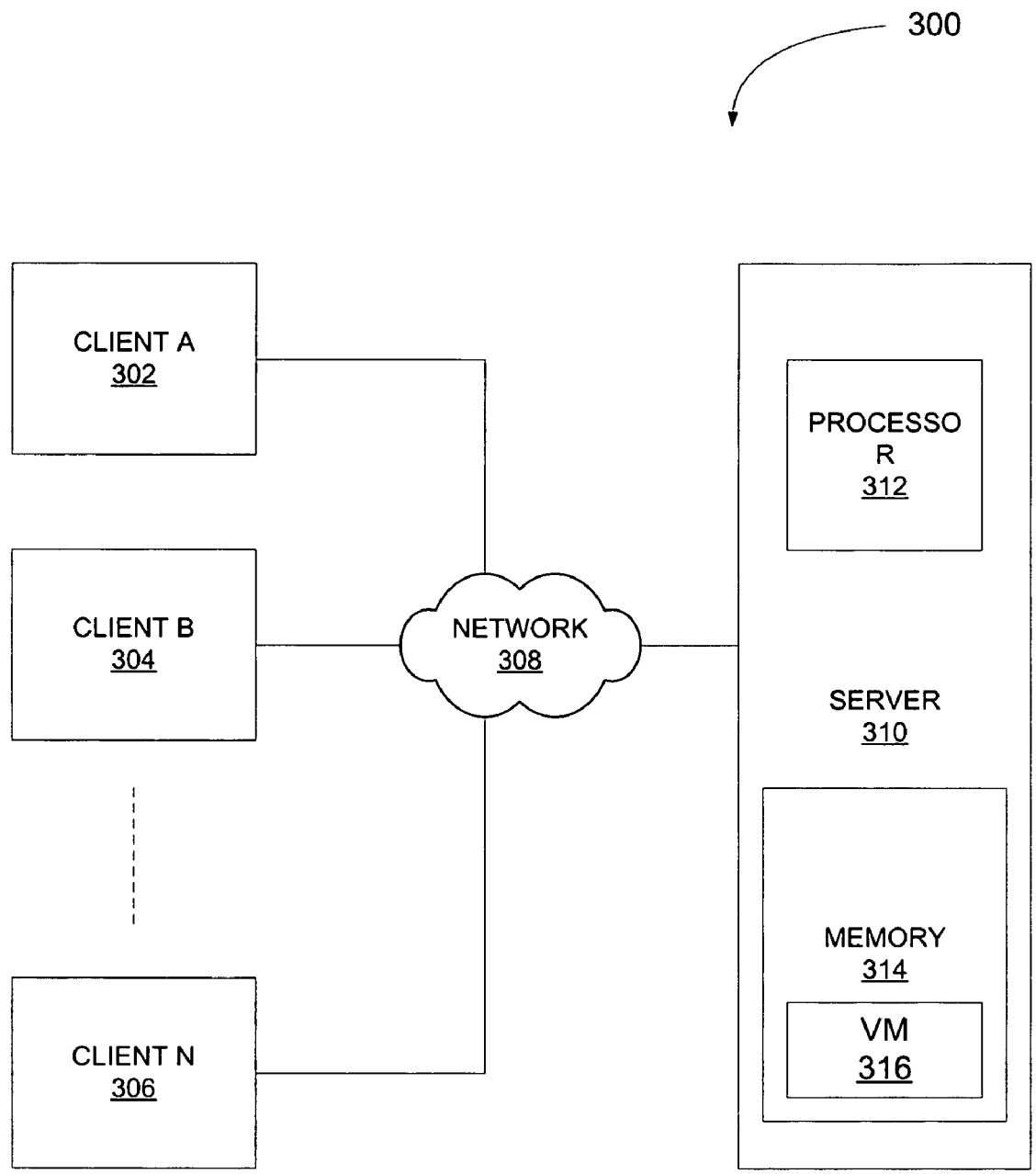
FIG. 3 illustrates an exemplary client/server system using in implementing one or more embodiments of the invention.

FIG. 3 illustrates an exemplary client/server system 300 using in implementing one or more embodiments of the invention. In the illustrated embodiment, a network 308 links a server 310 with various client systems A-N 302-306. The server 310 is a programmable data processing system suitable for implementing apparatus, programs, or methods in accordance with the description. The server 310 provides a core operating environment for one or more runtime systems that process user requests. The server 310 includes a processor 312 and a memory 314. The memory 314 can be used to store an operating system a Transmission Control Protocol/Internet Protocol (TCP/IP) stack for communicating over the network 308, and machine-executable instructions executed by the processor 312. In some implementations, the server 310 can include multiple processors, each of which can be used to execute machine-executable instructions.

The memory 314 can include a shared memory area that is accessible by multiple operating system processes executing at the server 310. An example of a suitable server to be implemented using the client/server system 300 includes J2EE compatible servers, such as the Web Application Server from FIG. 2 developed by SAP AG of Walldorf, Germany, or the WebSphere Application Server developed by International Business Machines Corp. (IBM) of Armonk, N.Y.

Client systems 302-306 are used to execute multiple applications or application interfaces. Each instance of an application or an application interface can constitute a user session. Each user session can generate one or more requests to be processed by the server 310. The requests may include instructions or code to be executed on a runtime system (e.g., the VM 316) on the server 310. A VM 316 is an abstract machine that can include an instruction set, a set of registers, a stack, a heap, and a method area, like a real machine or processor. A VM 316 essentially acts as an interface between program code and the actual processor or hardware platform on which the program code is to be executed. The program code includes instructions from the VM instruction set that manipulates the resources of the VM 316.

Figure 4A:
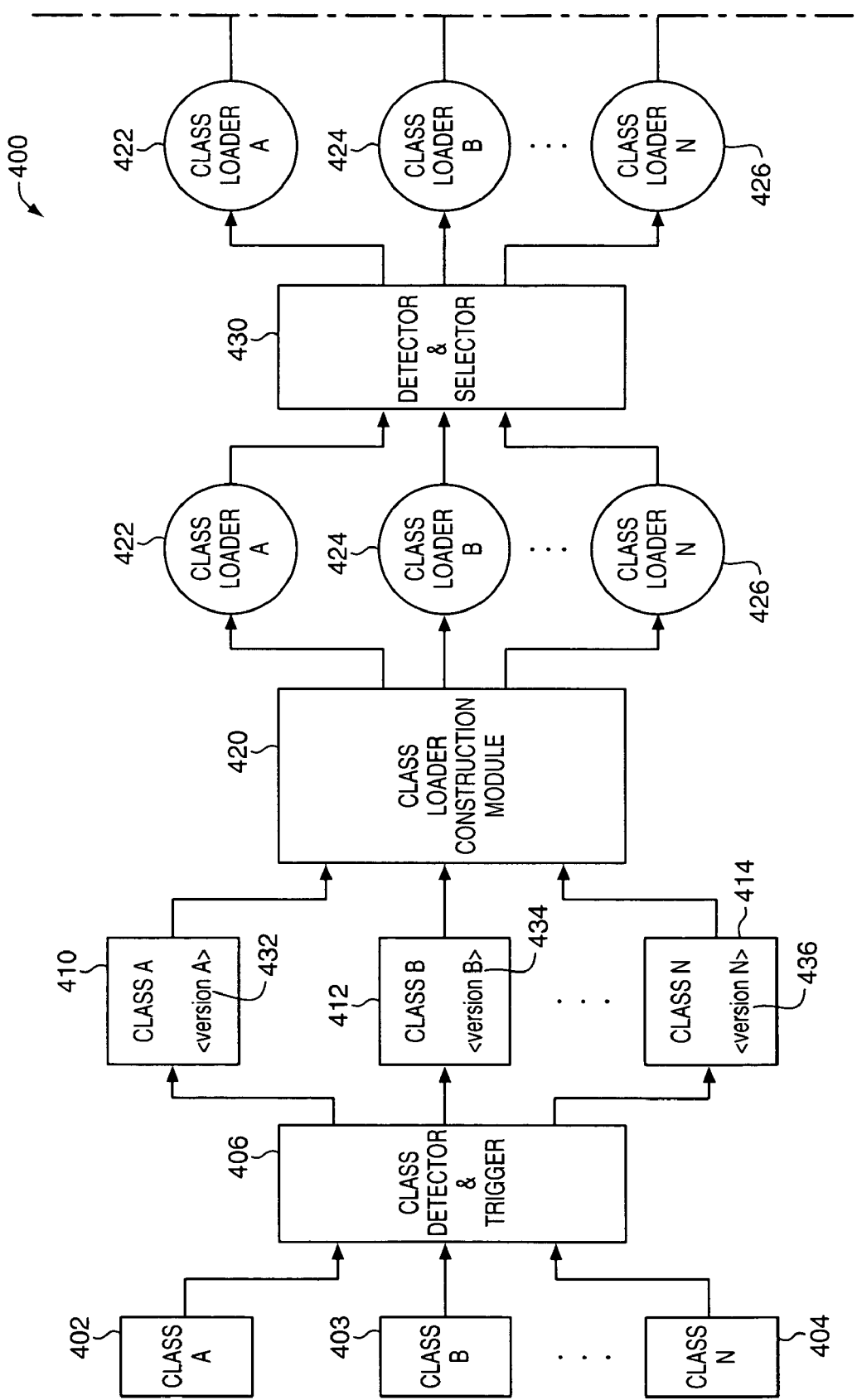
FIGS. 4A-4B illustrate an embodiment of version-based class loading mechanism.
Figure 4B:
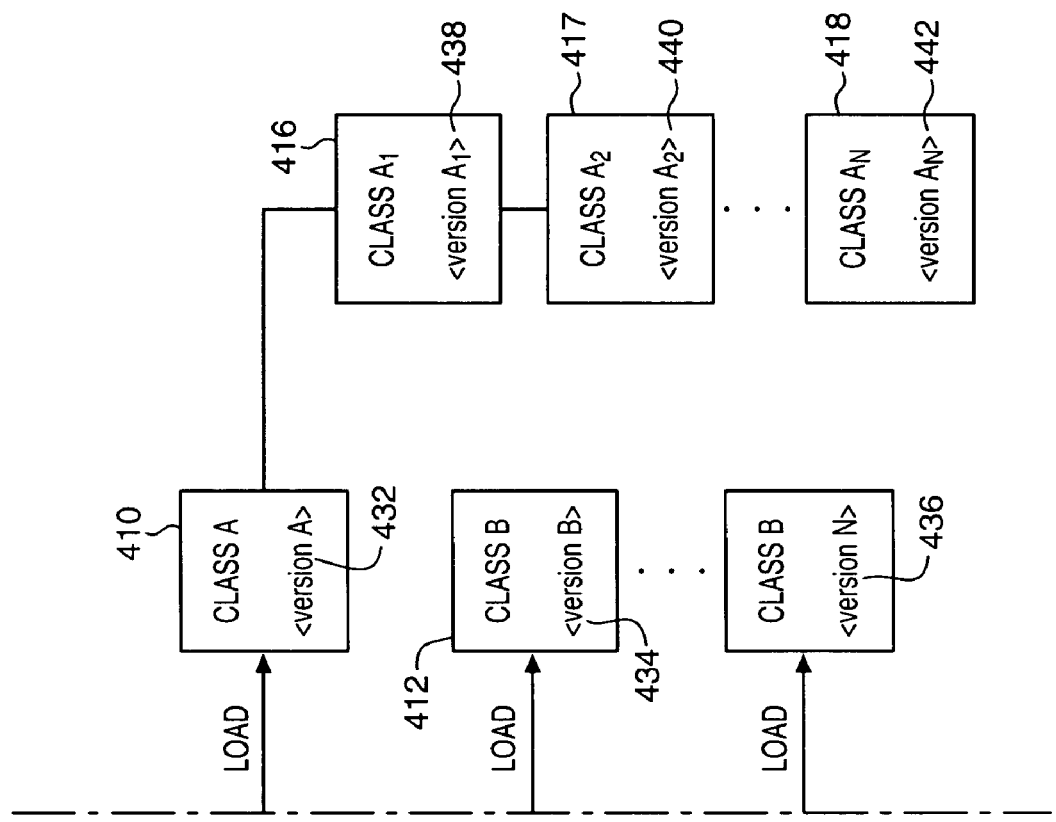

FIGS. 4A-4B illustrate an embodiment of version-based class loading mechanism 400. Typically, using any given class loading mechanism, whenever a virtual machine (e.g., Java VM) detects a class that needs to be loaded because it is needed by another class (e.g., the "caller" class), the class loader (e.g., system class loader, which is typically the one that is used to start up the VM) of the caller class is queried to load that class. The system class loader looks up the class path given to locate the binary (e.g., byte code) of the class that is to be loaded. The byte code is then used by the virtual machine to build up the class. Any classes need for constructing the class are also queried through the same class loader, such as user-defined class loaders which extend the abstract class (e.g., <java.lang.ClassLoader>) directly or indirectly. Also, within <java.lang.ClassLoader> there are methods that allow influencing the way class binaries are found and retrieved. For example, the binary information of various classes is passed as a byte array to the class definition methods themselves.

In one embodiment, once classes A-N 402-404 of different versions (e.g., A-N being the corresponding versions) are distinguished and recognized, the classes 402-404 are detected by a class detector and tagger 406 (detector/tagger). The detector/tagger 406 refers to a module that not only detects such classes 402-404, but tags 432-436 the binary classes in such as way that their distinct version is distinguished within the class path. For example, such tagging can be achieved by putting a version dependent prefix (e.g., <version A> 432) in each of the class' 410-414 respective package path. In one embodiment, classes A-N 402-404 include the same class in different versions, while, in another embodiment, classes A-N 402-404 refer to different classes in different versions.

In one embodiment, having distinguished the various classes 410-414 by their respective versions, such as tagged versions A-N 432-436, a new class loader A-N 422-426 is constructed for each of the detected version of classes 410-414. These class loaders 422-426 are generated using a class loader construction module 420, which detects classes 410-414 have distinct versions, and in response, generates a class loader 422-426 to help facilitate loading of each of those classes 410-414. For example, class loader A 422 is created to help facilitate loading of class A 410 by making use of the version tag <version A> 432.

The application, in one embodiment, then detects which version 432-436 is needed for continuing use or execution of the application, and classes 410-414 of those versions 432-436 are then loaded using the corresponding class loaders 422-426. The detection of which version 432-436 is needed may be performed using an application-based detector and selector 430 or an independent module for detection and selection of classes 410-414 and class loaders 422-426 may be employed. For example, the detector and selector 430 first detects that class A 410 is needed for continuing the application, and as such, it then selects the appropriate class loader, such as class loader A 422, that is capable of loading class A 410 to help load the class 410. In one embodiment, a server-client application may use a version specific handshake between the server and the client to detect which version 432-436 of classes 410-414 is needed and accordingly, the appropriate class 410-414 is loaded. It is contemplated that in many instances, more than one class 410-414 (simultaneously or subsequently) may be loaded because of a need for a number of or a combination of versions 432-436.

In one embodiment, prior to running the application, appropriately packaged classes 410-414 are provided, i.e., the classes 410-414 are associated with their appropriate versions 432-436 before start running the application. Not only these classes 410-414 are loaded through the file system, but also from any other source capable of supplying binary data, like using a Transmission Control Protocol/Internet Protocol, a database, and the like. In other words, different versions 432-436 can be packaged on different locations in the Internet, database tables, and the like. The tagging is not to be restricted to the path, including nether neither the package path nor the physical binary path. In one embodiment, the packaged or tagged classes 410-414 are not necessary provided within or during the already running application, but that these classes 410-414 are provided prior to starting or running the application. At any given point, the application seeks a particular version 432-436 that is needed to continue running the application. Once the knowledge about the needed version 432-436 is obtained, an appropriate class loader 422-426 is created (or taken from a pool as described with reference to FIG. 5, or delegated as described with reference to FIG. 6). If then the class 410-414 is to be loaded, the appropriate class loader 422-426 is used to load that class 410-414 and it dependent classes 416-418, if any, as the appropriate class loader 422-426 has information on how to find the appropriate class 410-414, which has been previously tagged according to its version 432-436. It is understood that mechanism and techniques described here may also apply to other embodiments, such as the ones described with reference to FIGS. 5-6.

As used herein, the term "application" is used broadly to refer to any type of program code executed on a computer and/or transmitted over a network (e.g., using a particular network protocol). One embodiment of the invention is implemented in an object-oriented programming environment such as Java (e.g., within a Java 2, Enterprise Edition (J2EE) platform/engine). In this embodiment, each of the illustrated modules, such as modules 406, 420, 430, is represented by objects and/or classes. The classes and/or objects of this embodiment comprise an API usable to configure compatibility framework using versioning class loaders within a Java environment. It should be noted, however, that the underlying principles are not limited to any particular programming environment.

The class 410 to be loaded may also have dependent classes $A_1$-$A_N$ 416-418. In one embodiment, the same class loader A 422 is also capable of loading any dependent classes 416-418 of class A 410. For example, once a class loader A 422 is created and is capable of loading class A 410, the same class loader 422 is also capable of loading any dependent or subsequent classes $A_1$-$A_N$ 416-418 for that class A 410. This is accomplished using the same versioning class loader mechanism 400. In one embodiment, the dependent classes 416-418 may be assigned the same version tag, such as <version A> 432, as class A 410 or, in another embodiment, the dependent classes 416-418 are assigned a different version tag, such as <version $A_1$> 438 as illustrated. In either case, dependent classes 416-418 are tagged and identified in accordance with the version 432-436 associated with the main class 410-414. Also, the dependent classes 416-418 are loaded by the same class loader 422-426 capable of loading the main class 410-414.

Figure 5:
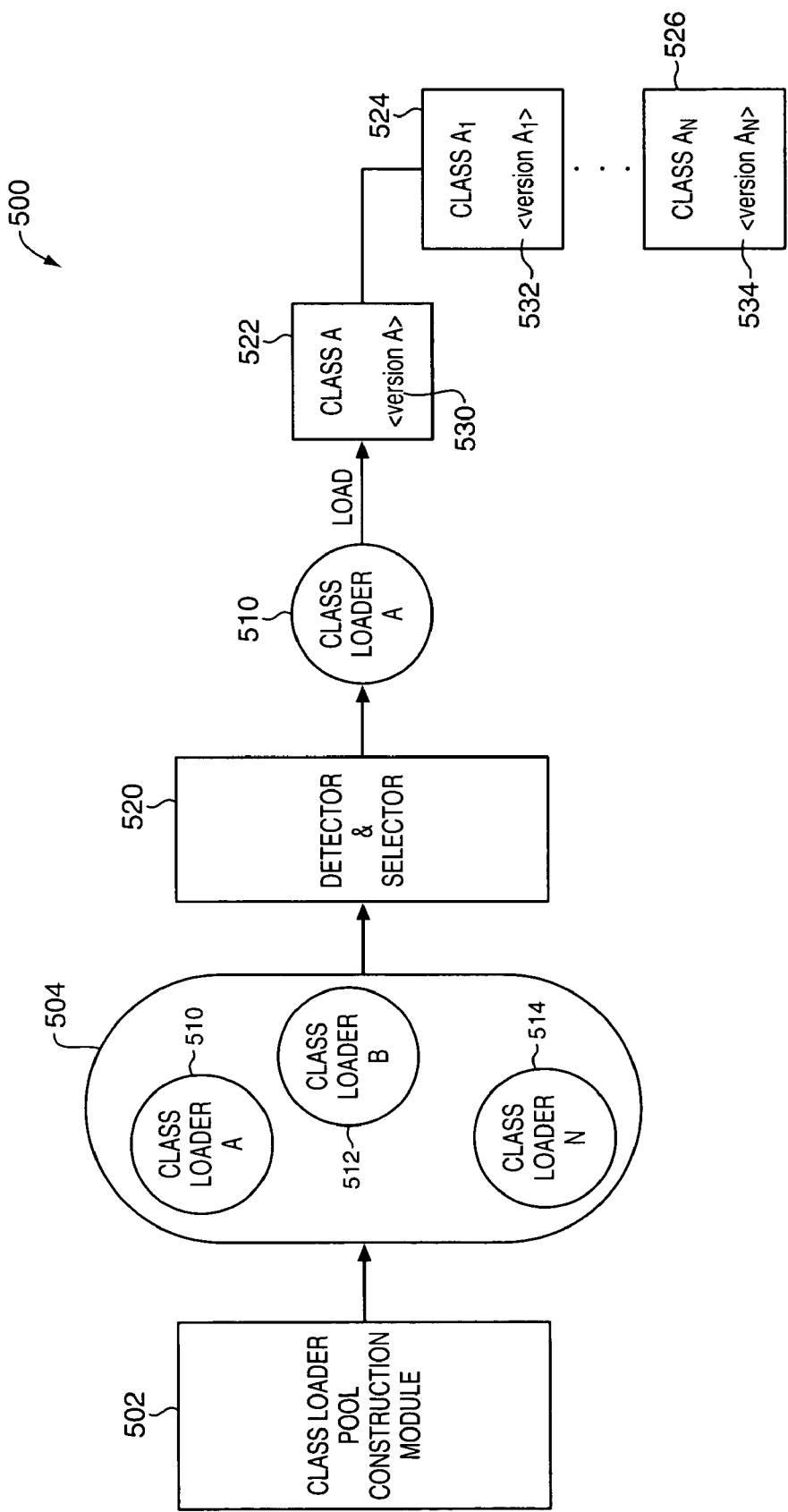
FIG. 5 illustrates an embodiment of version-based class loading mechanism.

FIG. 5 illustrates an embodiment of version-based class loading mechanism 500. Using the versioning class loader mechanism 400 of FIGS. 4A-4B, classes associated with various versions are realized, detected, and tagged using a module similar to that of class detector and tagger 406. In one embodiment, a class loader pool construction module 502 is then used to generate a pool 504 having various class loaders 510-516 to help facilitate loading of classes with various versions. The assigning of a version (e.g., <version A> 530) includes inserting a version dependent prefix in the respective or corresponding package path of the class. Such prefix or tags are then used by a module, such as the class loader pool construction module 502, to detect various class versions and use them as reference when creating the pool 504 of class loaders A-N 510-514 capable of loading classes of corresponding versions.

In one embodiment, detector and selector 520, a module with detection and selection capabilities, is used to detect the version of class needed to be loaded to continue running the application. Once a particular class detected, an appropriate class loader 510-514 from the pool 504 is selected to perform class loading of the class. For example, using the detector and selector 520, if class A 522 is required in <version A> by the application, class loader A 510 is selected from the pool 504 to load class A 522. In one embodiment, the same class loader A 510 is also capable of and is used for loading any dependent classes $A_1$-$A_N$ 524-526 of class A 522. In one embodiment, the same tag, such as <version A> 530, associated with class A 522 may be associated with its dependent classes 524-526, or individual tags, such as <version $A_1$> 532 and <version $A_N$> 534, may be assigned to the paths of the dependent classes 524-526.

Figure 6:
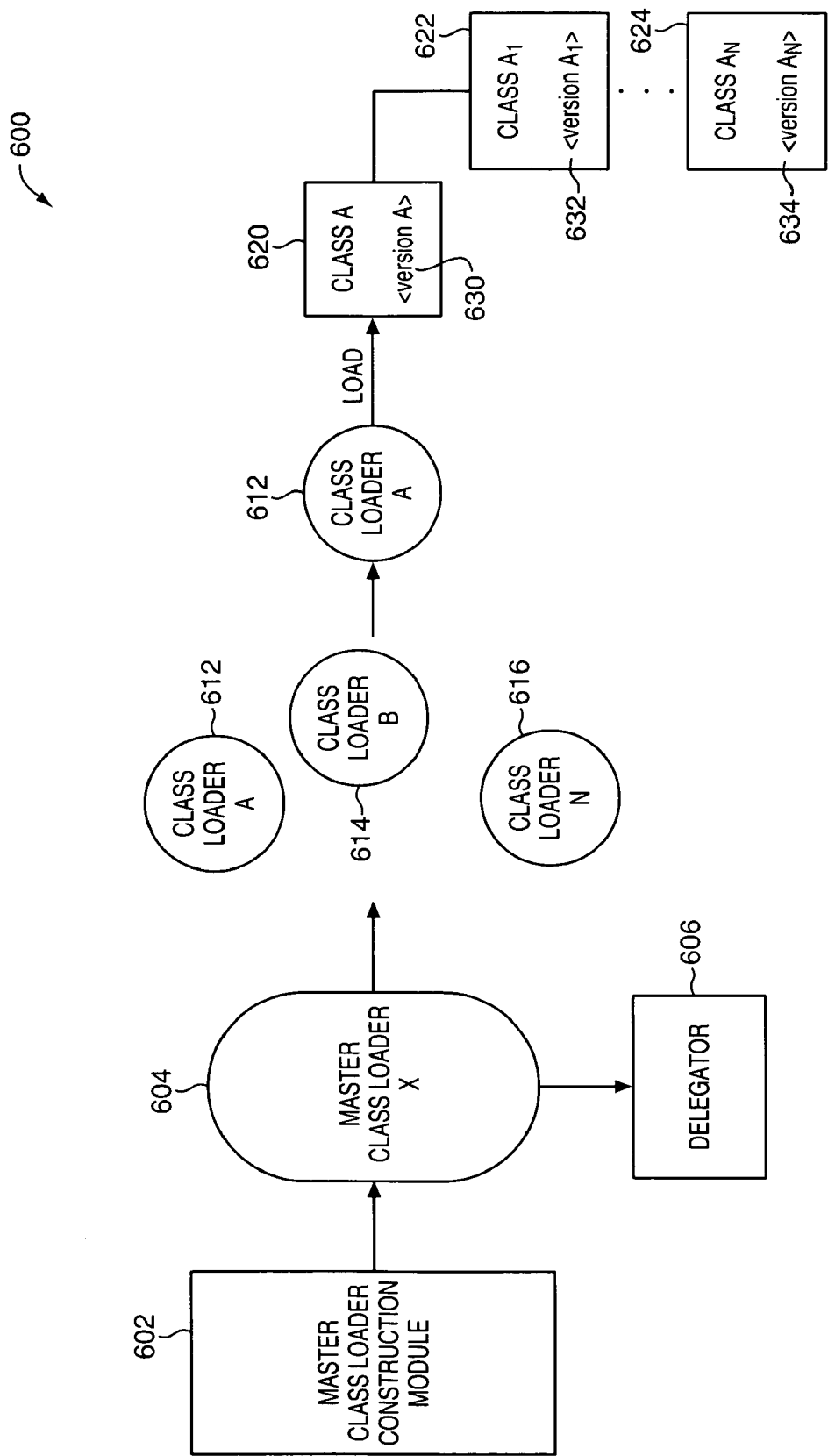
FIG. 6 illustrates an embodiment of version-based class loading mechanism.

FIG. 6 illustrates an embodiment of version-based class loading mechanism 600. In yet another embodiment of version-based class loading, a master class loader construction module 602 is used to construct a single master class loader X 604. Class loader X 604 works with delegator 606 to facilitate delegation of class loading to class loaders A-N 612-616. For example, the application seeks <version A> 630 as being the version to be loaded to continue running the application, and once the appropriate version is identified, the master class loader X 604 works with the delegator 606 to facilitate delegation of loading version A-based class A 620 to an appropriate class loader A 612. As opposed to creating a pool of class loaders, as described with reference to FIG. 5, in the illustrated embodiment, the class loader 604 delegates loading to class loaders 612-616. In one embodiment, the same class loader A 612 is also capable of and used to load any number of dependent classes $A_1$-$A_N$ 622-624 of class A 620. It is contemplated that with respect to any of FIGS. 4A, 4B, 5 and 6, the number and type of modules, controllers, and interfaces can change in accordance with the needs and demands of the system and/or developers. The modules and interfaces provided here and discussed throughout this description are merely simplified examples for illustration purposes.

Figure 7:
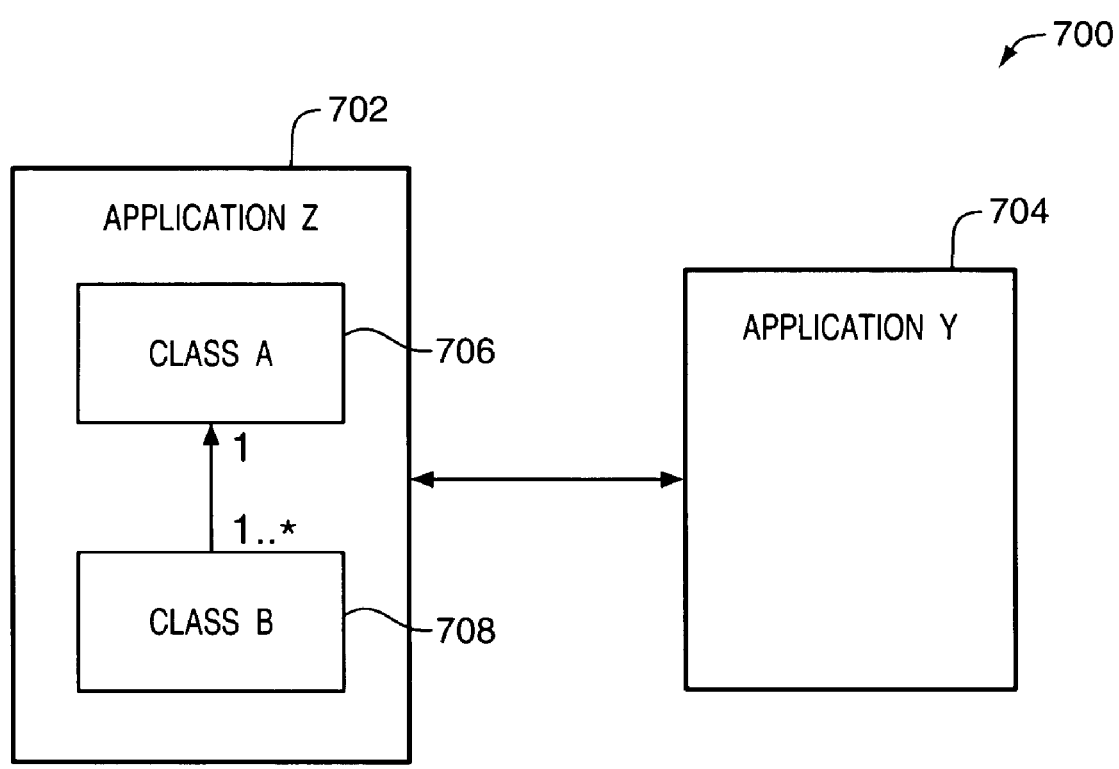
FIG. 7 illustrates an embodiment of version-based class loading mechanism.

FIG. 7 illustrates an embodiment of version-based class loading mechanism 700. In the illustrated embodiment, two applications Z 702 and Y 704 are provided. For example, application Z 702 is in communication with application Y 704, in which two types of classes A and B 706-708 are involved. Further, several instances (e.g., <1 . . . *>) of class B 708 may be regarded as parts or fields of class A 706. Here, class A 706 is regarded as responsible for at least part of the communication with application Y 704. There may be several versions of application Y 704 in the field, and communication with application Y 704 requires the correct version(s) of classes A and B 706-708.

In one embodiment, application Z 702 requests the respective version of classes A and B 706-708 from application Y 704. Once this information is retrieved, an appropriate corresponding class loader is constructed (as described with respect to FIGS. 4A-4B), requested (as described with reference to FIG. 5), or directed/redirected (as described with reference to FIG. 6) to the particular class. For example, class A 706 is requested and loaded by the corresponding class loader. The VM then detects that class B 708 is needed for constructing class A 706 and subsequently, the VM requests for class B 708 to be loaded using the same class loader. Class B 708 is then loaded using the corresponding class loader.

Once both classes A and B 706, 708 have been loaded using the same class loader, both classes 706-708 have been loaded in the version required. Regarding class B 708, other present dependent objects of class B 708 are loaded automatically using the VM class loading mechanism without any visibility to the developer. In one embodiment, using the versioning class loader mechanism 700, several versions of the same class A, B 706, 708 can be used simultaneously in the same virtual machine. For example, a server could communicate with various versions of a client in the fields that remain invisible to the developer or programmer of an application.

Figure 8:
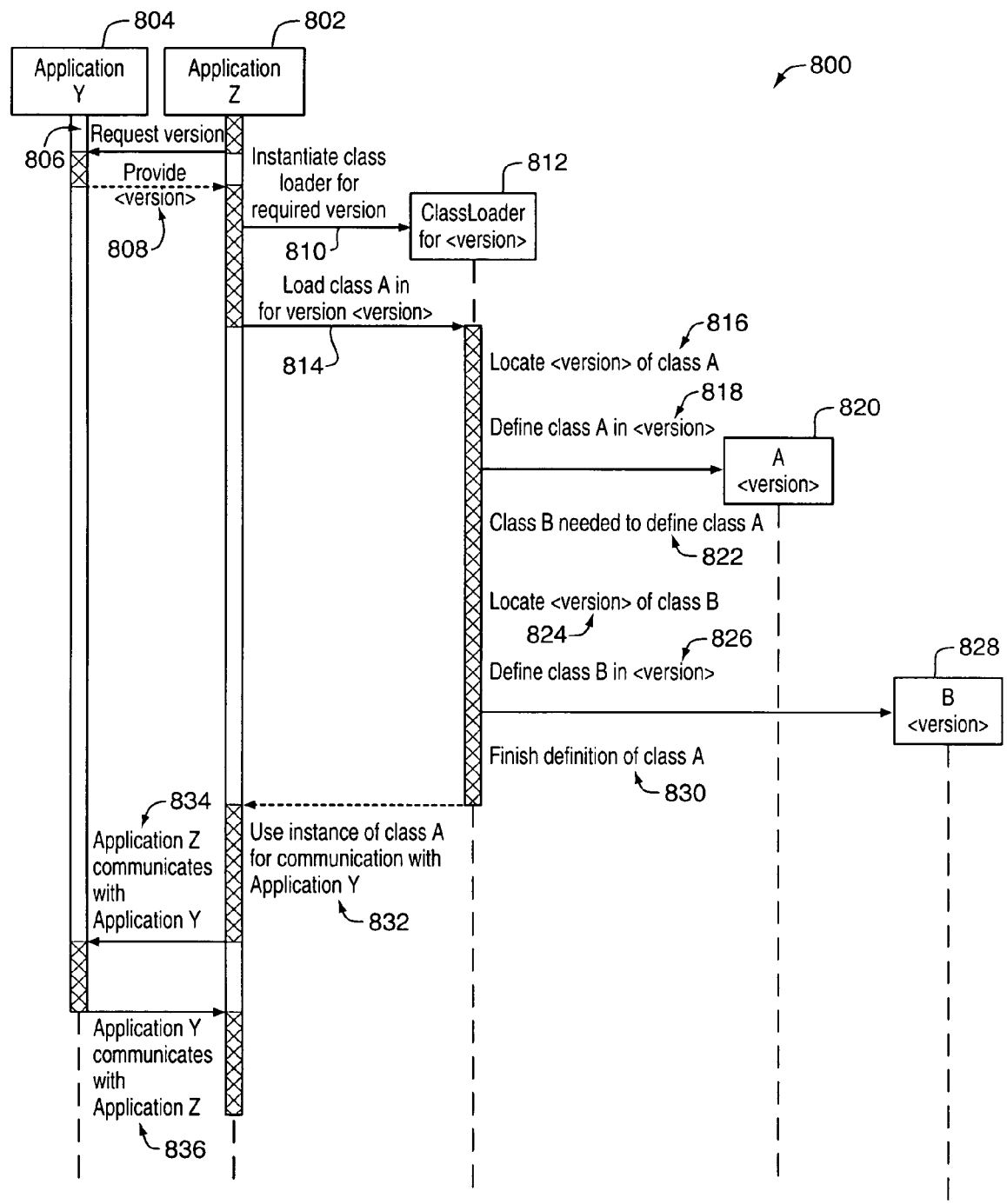
FIG. 8 illustrates an embodiment of a transaction sequence for using version-based class loading.

FIG. 8 illustrates an embodiment of a transaction sequence for using version-based class loading. The illustrated embodiment is based on the example used in FIG. 7 with respect to applications Z and Y 702, 704 and classes A and B 706, 708. In the illustrated embodiment, application Z 802 requests a version 806 from application Y 804. Application Y 804 responds with providing the version 808 to application Z 802. Application Z 802 instantiates 810 an appropriate class loader for the required version 812. The class, such as class A, is loaded 814 by the corresponding class loader 812 for the required version. The version of class A is located 816 and subsequently, class A is defined in that version 818, such as version A 820.

Class B is also needed to completely define class A 822. In one embodiment, the version of class B is then located 824, and class B is defined in that version 826, such as version B 828. Using class B, class A is completely defined 830. Then, the instance of class A is used for communication 832 with application Y 804. Application Z 802 communicates 834 with application Y 804. Application Y 804 communicates 836 with application Z 802.

Figure 9:
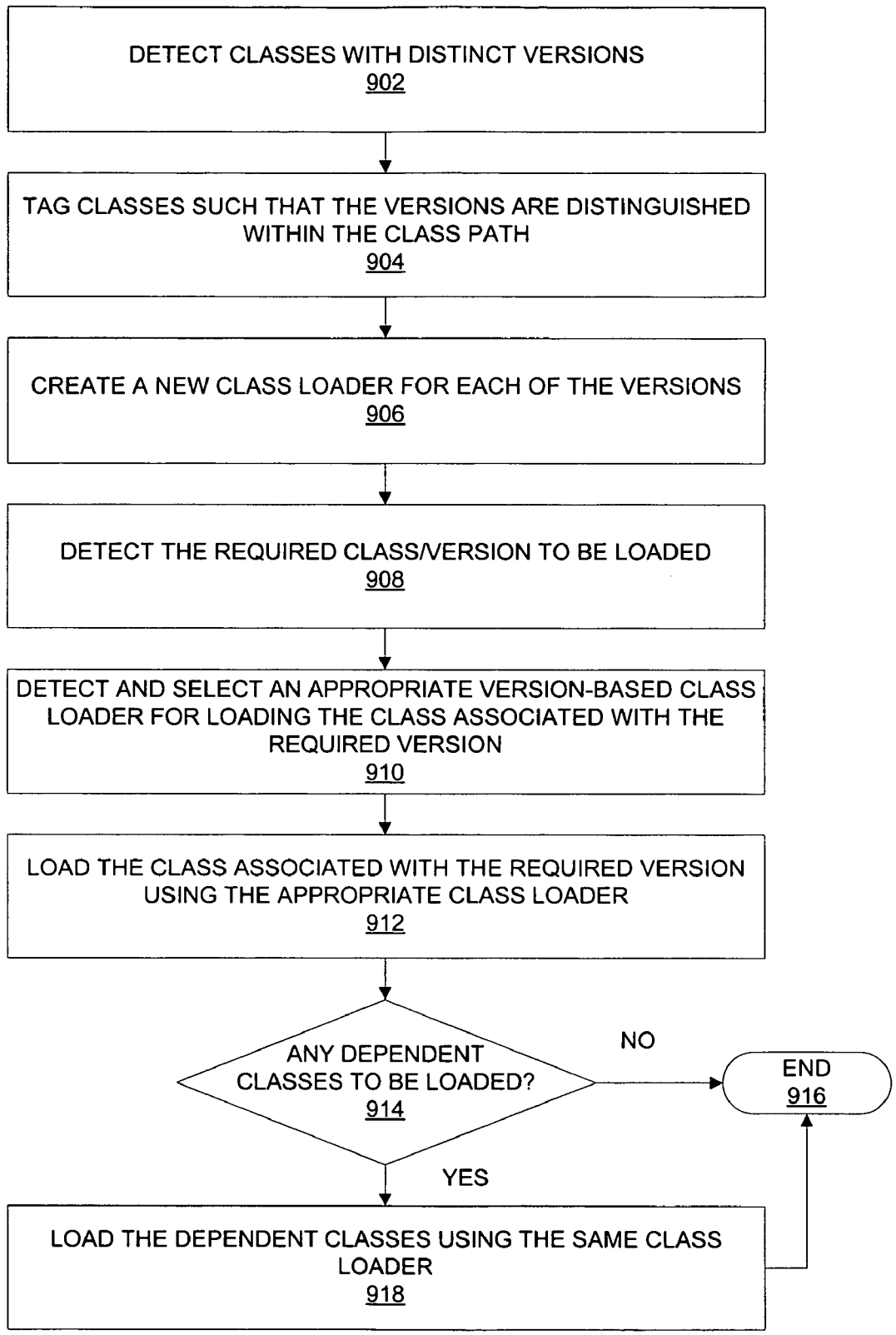
FIG. 9 illustrates an embodiment of a process for constructing version-based class loaders.

FIG. 9 illustrates an embodiment of a process for constructing version-based class loaders. First, various classes with distinct versions are detected at processing block 902. These classes are then tagged in a way that their versions are distinguished within the class path at processing block 904. For example, a version-based prefix is inserted in the classes' respective package paths. In one embodiment, at processing block 906, a new class loader is constructed for each version of the class, such that the new class loader is capable of loading that version of the class. The new class loader may use the version tag, as described above, to find the correct version of the class that is to be loaded.

At processing block 908, the application detects which version of the class is needed for continuing, so that the class can be loaded. At processing block 910, the appropriate class loader is detected and selected to load the class. The class loader loads the class at processing block 912. At decision block 914, a determination is made as to whether there are any dependent classes of the class that are to be loaded. If there are no dependent classes, the process ends at termination block 916. If there are such dependent classes, the same class loader is used to load the dependent classes at processing block 918. The process ends at termination block 916.

Figure 10:
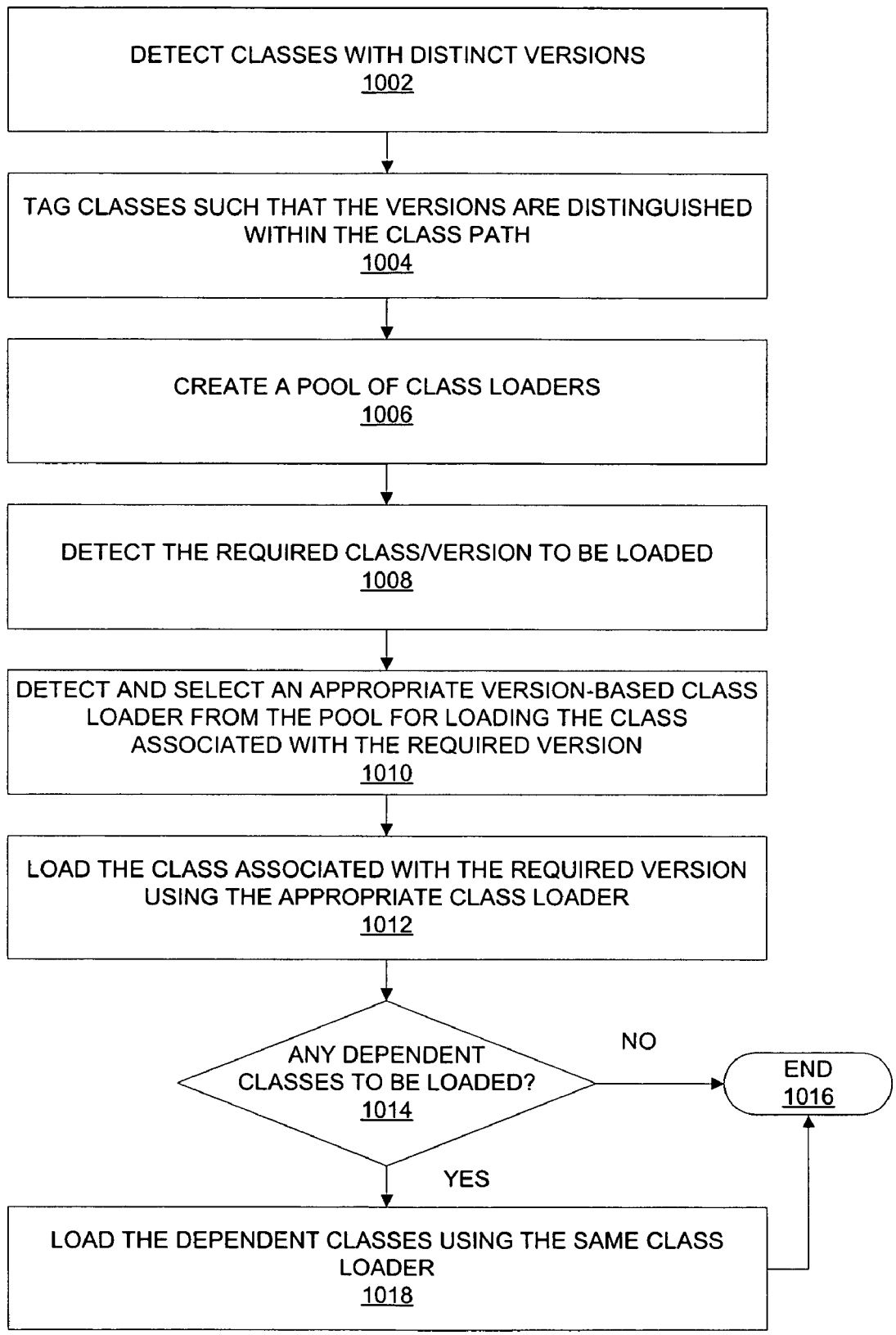
FIG. 10 illustrates an embodiment of a process for using a pool of version-based class loaders.

FIG. 10 illustrates an embodiment of a process for using a pool of version-based class loaders. First, various classes with distinct versions are detected at processing block 1002. These classes are then tagged in a way that their versions are distinguished within the class path at processing block 1004. For example, a version-based prefix is inserted in the classes' respective package paths. In one embodiment, at processing block 1006, a pool of class loaders is constructed having several class loaders, which includes a class loader for loading/corresponding to each of the class versions. In other words, the pool of class loaders includes, for each version, a class loader that is capable of loading the class associated with that version. These class loaders may use version tags, as described above, to find the correct version of the class that is to be loaded.

At processing block 1008, the application detects which version of the class is needed for continuing, so that the class can be loaded. At processing block 1010, an appropriate class loader to load the class is detected and selected from pool of class loaders. The class loader then loads the class at processing block 1012. At decision block 1014, a determination is made as to whether there are any dependent classes of the class that are to be loaded. If there are no dependent classes, the process ends at termination block 1016. If there are such dependent classes, the same class loader is used to load the dependent classes at processing block 1018. The process ends at termination block 1016.

Figure 11:
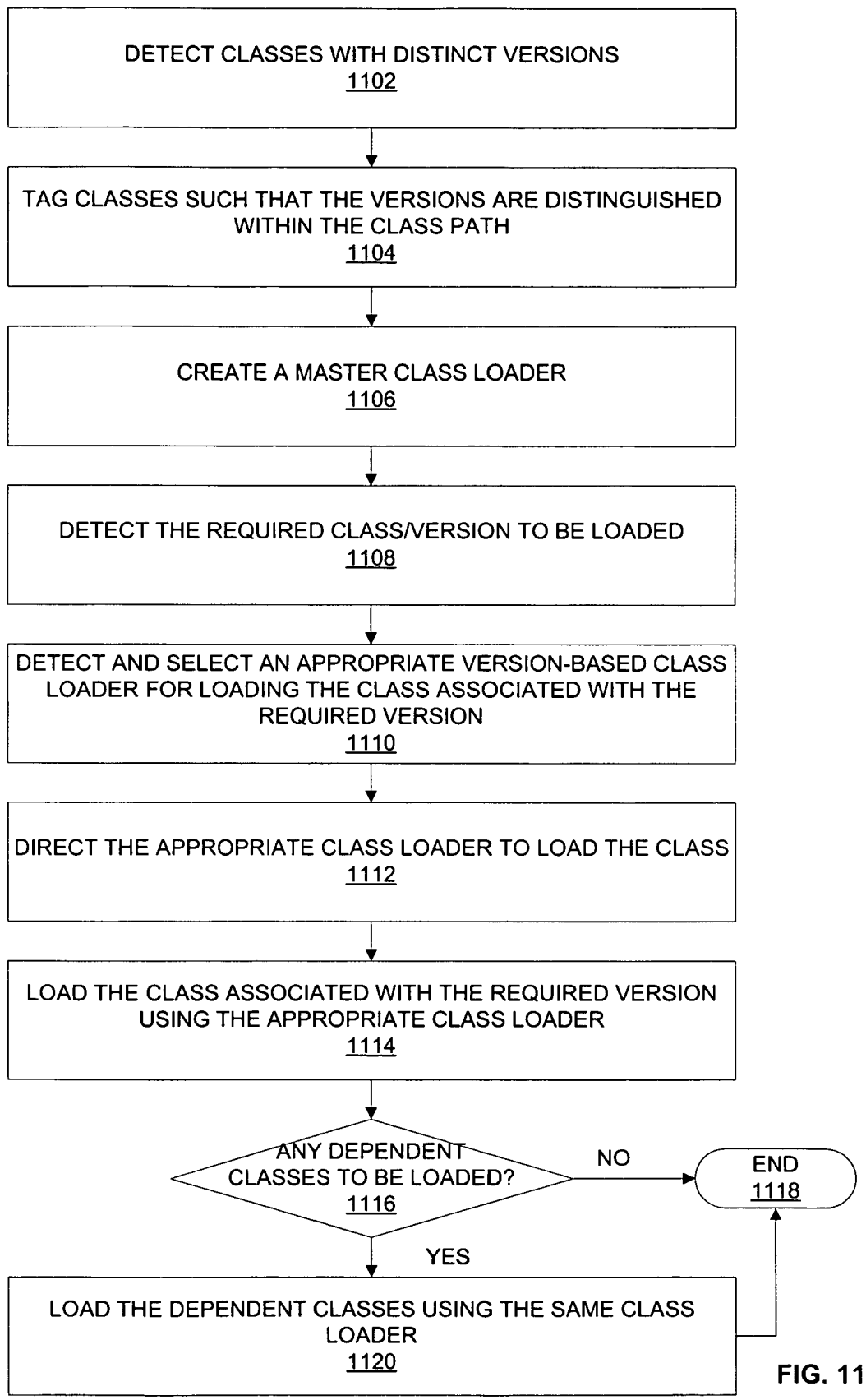
FIG. 11 illustrates an embodiment of a process for using a master class loader for version-based class loading.

FIG. 11 illustrates an embodiment of a process for using a master class loader for version-based class loading. First, various classes with distinct versions are detected at processing block 1102. These classes are then tagged in a way that their versions are distinguished within the class path at processing block 1104. For example, a version-based prefix is inserted in the classes' respective package paths. In one embodiment, at processing block 1106, a master class loader is constructed to communicate with other class loaders that are capable of loading various versions of classes. In other words, a single class loader is used to detect and select an appropriate class loader from various class loaders that is capable of loading the requested version. That single class loader is then further used to direct or redirect the appropriate class loader to load the requested version. In one embodiment, version tags may be used find the correct version of the class that is to be loaded.

At processing block 1108, the application detects which version of the class is needed for continuing, so that the class can be loaded. At processing block 1110, an appropriate class loader to load the class is detected and selected by the master class loader. At processing block 1112, the appropriate class loader is directed by the master class loader to load the class. The class loader then loads the class at processing block 1114. At decision block 1116, a determination is made as to whether there are any dependent classes of the class that are to be loaded. If there are no dependent classes, the process ends at termination block 1118. If there are such dependent classes, the same class loader is used to load the dependent classes at processing block 1120. The process ends at termination block 1118.

The architectures and methodologies discussed above may be implemented with various types of computing systems such as an application server that includes a Java 2 Enterprise Edition ("J2EE") server that supports Enterprise Java Bean ("EJB") components and EJB containers (at the business layer) and/or Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Figure 12:
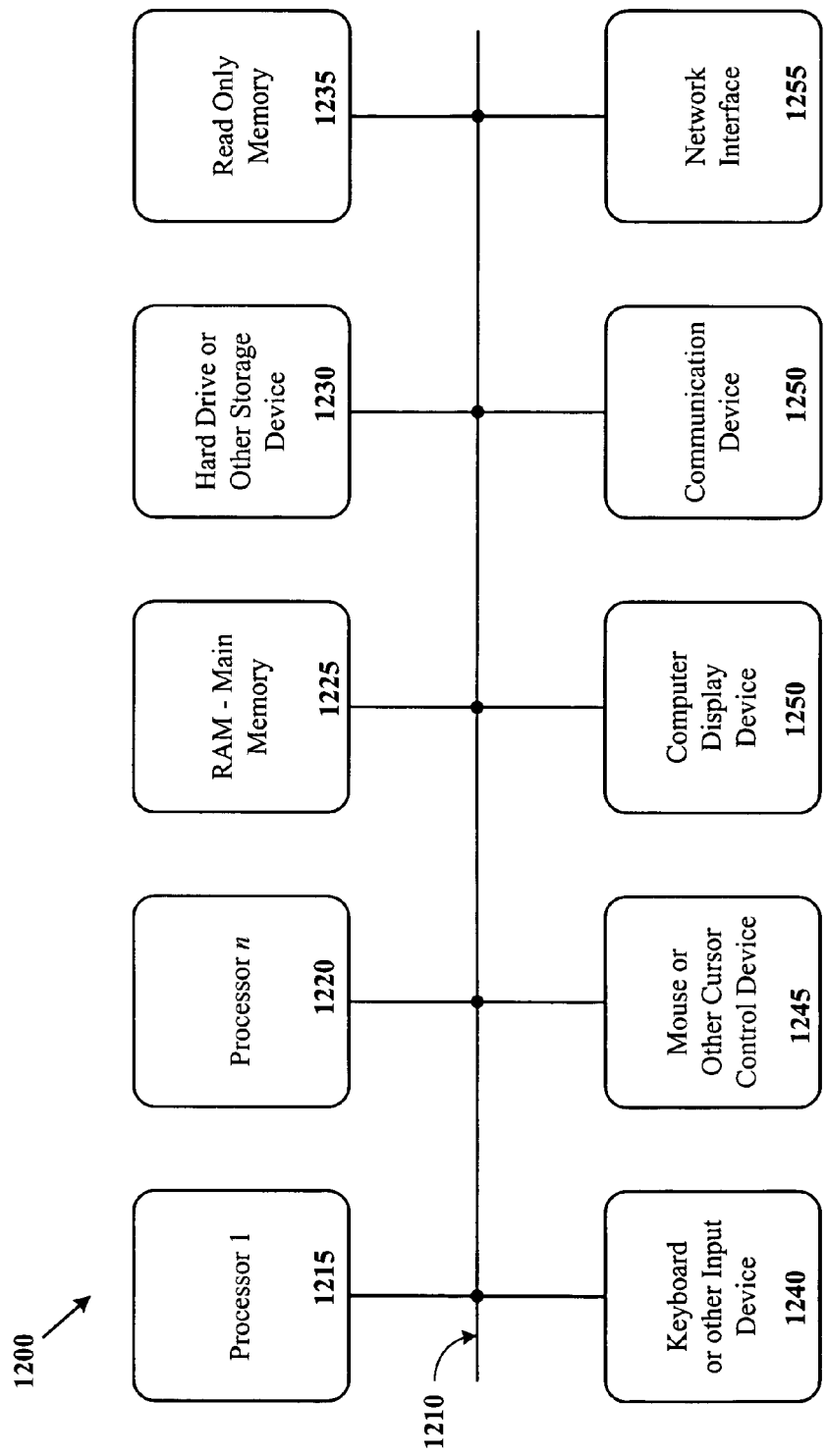
FIG. 12 is an exemplary computer system used in implementing one or more embodiments of the invention.

FIG. 12 is an exemplary computer system 1200 used in implementing an embodiment of the present invention. In this illustration, a system 1200 comprises a bus 1210 or other means for communicating data. The system 1200 includes one or more processors, illustrated as shown as processor 1 1215 through processor n 1220 to process information. The system 1200 further comprises a random access memory (RAM) or other dynamic storage as a main memory 1225 to store information and instructions to be executed by the processor 1215 through 1220. The RAM or other main memory 1225 also may be used for storing temporary variables or other intermediate information during execution of instructions by the processors 1215 through 1220.

A hard drive or other storage device 1230 may be used by the system 1200 for storing information and instructions. The storage device 1230 may include a magnetic disk or optical disc and its corresponding drive, flash memory or other non-volatile memory, or other memory device. Such elements may be combined together or may be separate components. The system 1200 may include a read only memory (ROM) 1235 or other static storage device for storing static information and instructions for the processors 1215 through 1220.

A keyboard or other input device 1240 may be coupled to the bus 1210 for communicating information or command selections to the processors 1215 through 1220. The input device 1240 may include a keyboard, a keypad, a touch-screen and stylus, a voice-activated system, or other input device, or combinations of such devices. The computer may further include a mouse or other cursor control device 1245, which may be a mouse, a trackball, or cursor direction keys to communicate direction information and command selections to the processors and to control cursor movement on a display device. The system 1200 may include a computer display device 1250, such as a cathode ray tube (CRT), liquid crystal display (LCD), or other display technology, to display information to a user. In some environments, the display device may be a touch-screen that is also utilized as at least a part of an input device. In some environments, the computer display device 1250 may be or may include an auditory device, such as a speaker for providing auditory information.

A communication device 1250 may also be coupled to the bus 1210. The communication device 1250 may include a modem, a transceiver, a wireless modem, or other interface device. The system 1200 may be linked to a network or to other device using via an interface 1255, which may include links to the Internet, a local area network, or another environment. The system 1200 may comprise a server that connects to multiple devices. In one embodiment the system 1200 comprises a Java® compatible server that is connected to user devices and to external resources.

While the machine-readable medium 1230 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1200 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1200 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

It should be noted that, while the embodiments described herein may be performed under the control of a programmed processor, such as processors 1215 through 1220, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A computer-implemented method for version-based class loading comprising:
   assigning a version tag to each of the a plurality of classes, the version tag specifying a version such that each class is identified in a class path by its specified version;
   creating a class loaders capable of loading each class according to its assigned version;
   receiving a first request, from a software application, to load a class associated with a first version tag, the software application being run on a runtime system of a computer system;
   detecting the first version tagged-class in the class path, in response to the first request; and
   loading the first version tagged-class via a first version tagged-class loader capable of loading the first version class according to the first version.

2. The computer-implemented method of claim 1, further comprising:
   receiving a second request, from the software application, to load a class associated with a second version tag;

detecting the second version tagged-class in the class path, in response to the second request; and loading the second version tagged-class via a second class loader capable of loading the second version tagged-class according to the second version tag.

3. The computer-implemented method of claim 1, further comprising:

detecting one or more first dependent classes depending on the first class;

assigning a second version tag to the one or more first dependent classes such that the one or more first dependent classes in the class path is distinguished from other version classes and dependent classes; and loading the one or more first dependent classes via the first version class loader.

4. The computer-implemented method of claim 1, further comprising:

creating a pool of class loaders including the first class loader and the second class loader, wherein each class loader is assigned a particular version to load classes of the particular version.

5. A system for version-based class loading comprising:

a server computer system having a processor coupled with a storage medium, the storage medium having a runtime system running a software application, the server computer system having an application server to:

assign a version tag to each of a plurality of classes such that each class identified in a classpath by its assigned version;

create class loaders capable of loading each class according to its assigned version tag;

receive a first request, from the software application, to load a class associated with a first version tag;

detect the first version tagged-class in the class path, in response to the first request; and load the first version tagged-class via a first version class loader capable of loading the first version tagged-class according to the first version tag.

6. The system of claim 5, wherein the application server is further to:

a create a pool of class loaders including the first class loader and the second class loader, wherein each class loader is assigned a particular version to load classes of the particular version.

7. The system of claim 5, wherein the application server is further to:

receive a second request, from the software application, to load a class associated with a second version tag;

detect the second version tagged-class in the class path, in response to the second request; and load the second version tagged-class via a second class loader capable of loading the second version tagged-class according to the second version tag.

8. The system of claim 5, wherein the application server is further to:

detect one or more first dependent classes depending on the first class;

assign a second version tag to the one or more first dependent classes such that the one or more first dependent classes in the class path is distinguished from other version classes and dependent classes; and load the one or more first dependent classes via the first version class loader.

9. A machine-readable medium having stored thereon data representing sets of instructions which, when executed by a machine, cause the machine to:

assign a version tag to each of a plurality of classes, the version tag specifying a version such that each class is identified in a class path by its specified first version;

create class loaders capable of loading each class according to its assigned version tag;

receive a first request, from a software application, to load a class associated with a first version tag, the software application being run on a runtime system of a computer system;

detect the first version tagged-class in the class path, in response to the first request; and load the first version tagged-class via a first version class loader capable of loading the first version tagged-class according to the first version tag.

10. The machine-readable medium of claim 9, wherein the sets of instructions which, when executed by the machine, further cause the machine to:

receive a second request, from the software application, to load a class associated with a second version tag;

detect the second version tagged-class in the class path, in response to the second request; and load the second version tagged-class via a second version class loader capable of loading the second version tagged-class according to the second version tag.

11. The machine-readable medium of claim 9, wherein the sets of instructions which, when executed by the machine, further cause the machine to create a pool of class loaders including the first class loader and the second class loader wherein each class loader is assigned a particular version to load classes of the particular version.

* * * * *